(12) United States Patent
Miller et al.

(10) Patent No.: US 6,948,285 B2
(45) Date of Patent: Sep. 27, 2005

(54) LOADING DOCK SHELTER WITH HOLLOW SIDE OR HEAD MEMBERS

(75) Inventors: Jason D. Miller, Dubuque, IA (US); Charles D. Ashelin, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/386,860

(22) Filed: Mar. 12, 2003

(65) Prior Publication Data

US 2004/0163326 A1 Aug. 26, 2004

Related U.S. Application Data

(63) Continuation-in-part of application No. 10/375,829, filed on Feb. 26, 2003, now abandoned.

(51) Int. Cl.$^7$ ................................................ E04H 1/00
(52) U.S. Cl. .................... 52/173.2; 52/173.1; 52/204.1; 52/2.11; 52/2.12; 52/2.13; 52/DIG. 13; 49/504; 405/110; 16/784.16; 16/277; 16/287; 16/297
(58) Field of Search .............................. 52/173.2, 173.1, 52/204.1, 2.11, 2.12, 2.13, 36, DIG. 13, 211.1, 212.3, DIG. 3; 49/504; 160/57; 405/110; 16/784.16, 277, 278, 297

(56) References Cited

U.S. PATENT DOCUMENTS

| | | | | |
|---|---|---|---|---|
| 391,096 A | * | 10/1888 | Stover .......................... | 16/297 |
| 845,863 A | * | 3/1907 | Erickson ....................... | 16/278 |
| 866,791 A | * | 9/1907 | Keown .......................... | 16/256 |
| 3,212,126 A | * | 10/1965 | Ruiz ............................. | 16/297 |
| 3,352,314 A | * | 11/1967 | Frommelt et al. .......... | 52/173.2 |
| 3,638,667 A | * | 2/1972 | Frommelt et al. .......... | 52/173.2 |
| 3,915,183 A | | 10/1975 | Frommelt | |
| 4,062,157 A | * | 12/1977 | Potthoff ...................... | 52/173.2 |

(Continued)

FOREIGN PATENT DOCUMENTS

| DE | 24 36 518 | 7/1974 |
|---|---|---|
| WO | WO 02/064908 | 8/2002 |

OTHER PUBLICATIONS

European Search Report from EP 04 00 5918 dated May 25, 2004.

"Twin Sheet Forming of Hollow Products," PV International Plastics Magazine, Zechner and Huethig Verlad, DE, vol. 3, No. 2, Oct. 1, 1992, pp. 16 and 18.

*Primary Examiner*—Carl D. Friedman
*Assistant Examiner*—Christy M. Green
(74) *Attorney, Agent, or Firm*—Hanley, Flight & Zimmerman, LLC

(57) ABSTRACT

In order to provide a durable loading dock shelter with an effective seal, the dock shelter is provided with a face panel that is relatively lightweight and firm, yet moveable for sealing against vehicles of various size and position. The face panel can be used as a side curtain or a head curtain. To provide the face panel with durability while minimizing its weight, the face panel is thermoformed of twin sheets of plastic to provide a durable outer shell with a hollow interior. In some embodiments, the face panel is moveable by virtue of an integral living hinge that connects the face panel to a generally stationary support panel.

34 Claims, 5 Drawing Sheets

U.S. PATENT DOCUMENTS

| | | | |
|---|---|---|---|
| 4,213,279 A | | 7/1980 | Layne |
| 4,718,207 A | | 1/1988 | Frommelt |
| 4,799,341 A | | 1/1989 | Frommelt et al. |
| 4,799,342 A | * | 1/1989 | Klevnjans .................. 52/173.2 |
| 4,805,362 A | * | 2/1989 | Frommelt et al. ......... 52/173.2 |
| 4,825,607 A | | 5/1989 | Frommelt et al. |
| 4,873,800 A | * | 10/1989 | Frommelt et al. ......... 52/173.2 |
| 5,282,342 A | * | 2/1994 | Brockman et al. ......... 52/173.2 |
| 5,341,613 A | | 8/1994 | Brockman et al. |
| 5,345,733 A | * | 9/1994 | Brockman et al. ......... 52/173.2 |
| 5,394,662 A | * | 3/1995 | Giuliani et al. ............ 52/173.2 |
| 5,407,632 A | | 4/1995 | Constantino et al. |
| 5,473,846 A | * | 12/1995 | Giuliani et al. ............ 52/173.2 |
| 5,533,234 A | * | 7/1996 | Bizek .......................... 16/308 |
| 5,553,424 A | * | 9/1996 | Brockman et al. ........... 52/2.12 |
| 5,953,868 A | * | 9/1999 | Giuliani et al. ............ 52/173.2 |
| 5,965,238 A | * | 10/1999 | Saitoh et al. ................ 428/178 |
| 6,014,844 A | * | 1/2000 | Thill ........................ 52/173.2 |
| 6,272,799 B1 | * | 8/2001 | Ashelin et al. ............ 52/173.2 |
| 6,276,098 B1 | * | 8/2001 | Berends et al. ............ 52/173.2 |
| 6,654,976 B2 | * | 12/2003 | Digmann et al. ............ 14/69.5 |
| 2002/0110423 A1 | * | 8/2002 | Miller et al. ................ 405/110 |
| 2004/0020141 A1 | * | 2/2004 | Borgerding ................ 52/173.2 |

\* cited by examiner

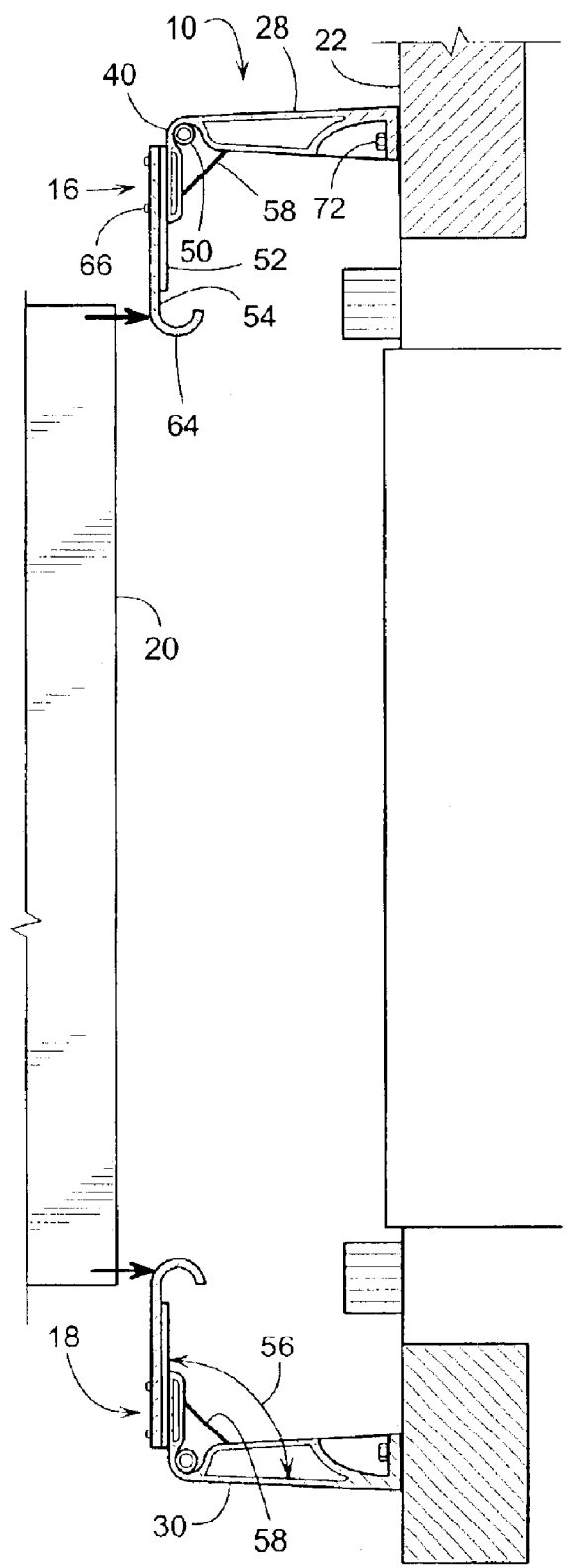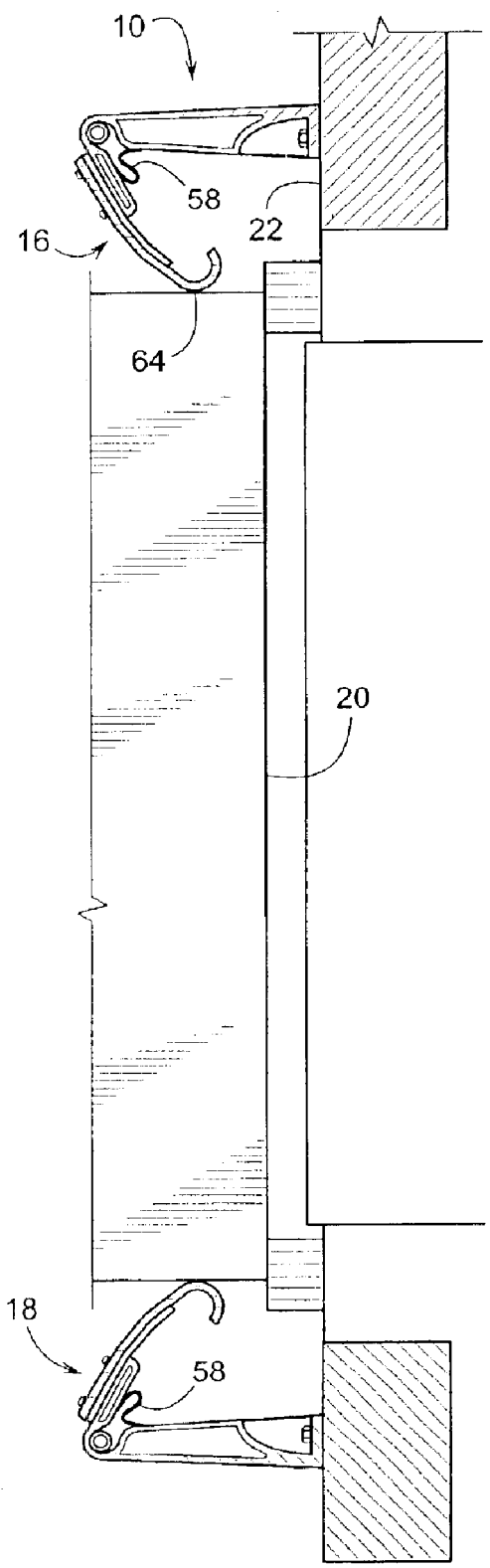

LOADING DOCK SHELTER WITH HOLLOW SIDE OR HEAD MEMBERS

CROSS-REFERENCE TO RELATED APPLICATION

This application is a continuation-in-part application of application Ser. No. 10/375,829, filed Feb. 26, 2003, now abandoned.

BACKGROUND OF THE INVENTION

1. Field of the Invention

The subject invention generally pertains to loading dock shelters and more specifically to a side or head shield for such a shelter.

2. Description of Related Art

Trucks and other vehicles typically back up against a loading dock or doorway of a building to facilitate loading and unloading of the vehicle's cargo. Often a dock shelter is installed around the doorway to help shelter the area between the perimeter of the doorway and the rear of the vehicle. If left unsheltered, air gaps between the outer wall of the building and the back of the vehicle might allow the outside weather to increase the building's heating or cooling load, allow rain and snow to enter the interior of the building, or simply subject the inside dock workers to an uncomfortable draft while they service the vehicle.

Dock shelters usually include a framework that extends one to three feet outward from the face of the building wall. In some cases, pliable curtains hang from the framework and are situated to drape over the top and either side of a vehicle parked under the shelter. Such curtains are generally not self-supporting and tend to be rather limp, which can create a poor appearance. Although, functionally, such shelters may be adequate in milder climates, additional or alternate sealing may be required where weather conditions are more severe or where tighter control of environmental conditions is required.

Thus, some loading docks are provided with dock seals made of resiliently compressible foam pads. As a truck backs its trailer into the dock and against the seal, the foam pads conform to the contour of the rear edges of the trailer. Although such seals provide a very effective seal, they do have a few drawbacks when compared to dock shelters. Foam dock seals are typically more expensive than dock shelters. Seals also reduce the access opening into the trailer because the foam pads overlap the perimeter of the trailer's opening. Moreover, a foam pad usually needs a tough outer cover to protect the pad from wear and to prevent the pad from absorbing water and dirt. A cover should be tough to resist wear yet pliable to allow compression of the foam. Unfortunately, some of the toughest cover materials are not very pliable, and vise versa. So, a compromise is often needed in selecting a cover with an optimum combination of toughness and pliability.

Consequently, a need exists for a dock shelter that provides a more positive seal than current shelters, yet is more economical than conventional dock seals.

SUMMARY OF THE INVENTION

A dock shelter is provided with a face panel that is relatively lightweight and firm, yet moveable for sealing against vehicles of various size and position. The face panel can be used as a side curtain or a head curtain. To provide the face panel with durability while minimizing its weight, the face panel includes a rather stiff and durable outer shell with a hollow interior. In some embodiments, the face panel is moveable by virtue of an integral living hinge that connects the face panel to a generally stationary support panel.

In some embodiments, the outer shell of the face panel comprises two half-shells that are fused to each other.

In some embodiments, the two half-shells provide both the face panel and the support panel.

In some embodiments, both the face panel and the support panel are hollow.

In some embodiments, the living hinge between the face panel and support panel is corrugated for greater flexibility.

In some embodiments, a torsion spring urges the face panel to an extended position.

In some embodiments, a pliable elongated member limits the pivotal extension of the face panel.

In some embodiments, the face panel includes a flexible extension plate that helps protect the main body of the face panel from wear.

In some embodiments, the hollow face panel includes recessed areas that enhance the face panel's rigidity.

BRIEF DESCRIPTION OF THE DRAWINGS

FIG. 2 is a cross-sectional top view taken along line 2—2 of FIG. 1 and shows a vehicle backing into the dock shelter.

FIG. 3 is the same as FIG. 2, but with the vehicle having already backed into the dock shelter.

DESCRIPTION OF THE PREFERRED EMBODIMENT

Figure 1:
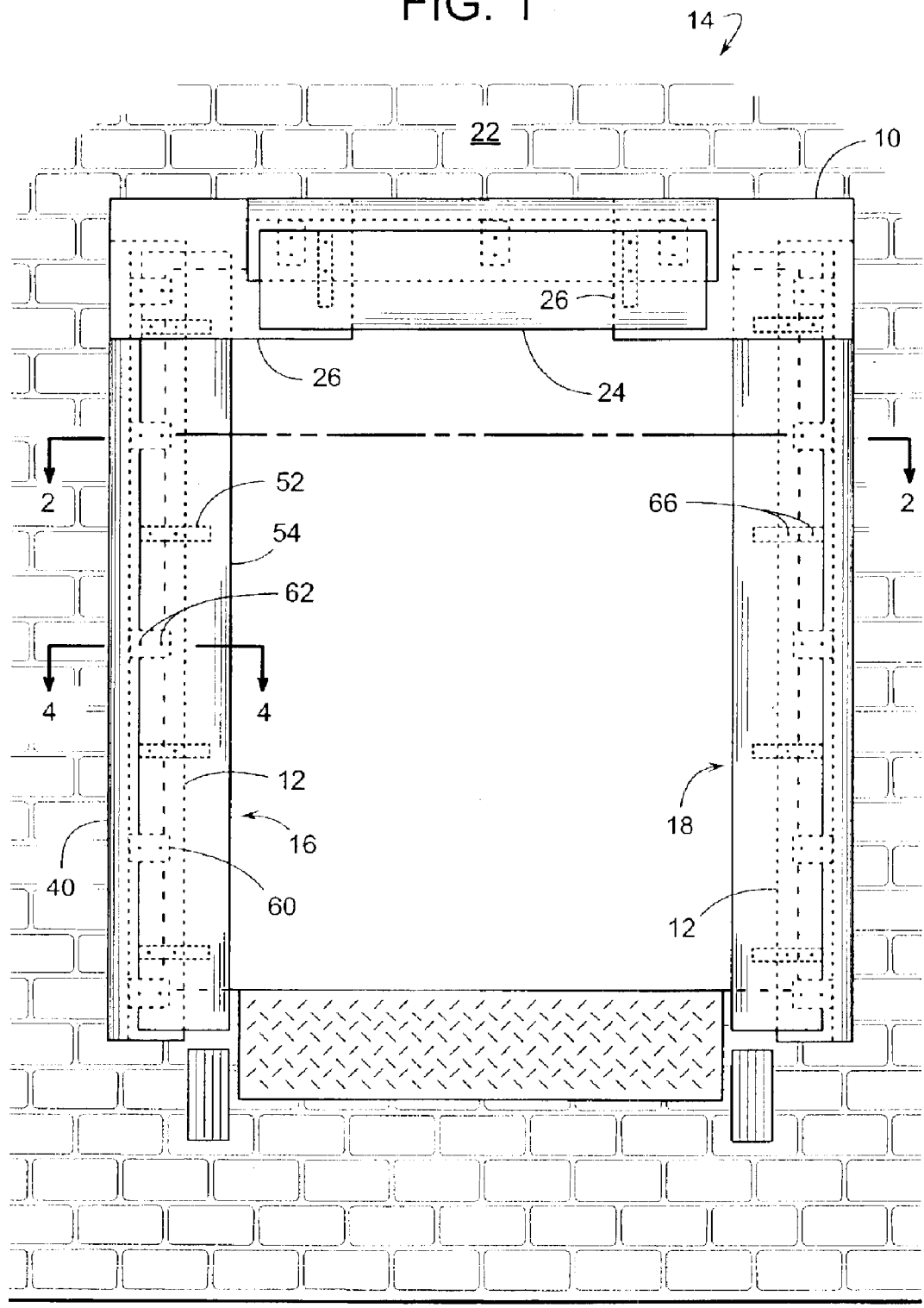
FIG. 1 is a front view of one embodiment of a dock shelter.

Referring to FIGS. 1–3, a dock shelter 10 installed around a doorway 12 of a loading dock 14 includes two face panels 16 and 18 that help provide a weather seal between the rear sides of a vehicle 20 and a wall 22 of a building. To help seal along a rear upper surface of vehicle 20, another face panel 24 (similar to panels 16 and 18 or of another design, such as a conventional curtain or a compressible foam pad) can be installed along an upper portion of dock shelter 10. To seal a gap that might exist between upper face panel 24 and the two lateral panels 16 and 18, a curtain 26 can be used to overlap adjacent panels.

Face panels 16 and 18 are coupled to wall 22 by way of two support panels 28 and 30 or by way of some other supporting structure. To allow the face panels to move in response to vehicle 20 backing into dock shelter 10, face panels 16 and 18 are pivotally connected to support panels 28 and 30, respectively. Vehicle 20 traveling from its position of FIG. 2 to that of FIG. 3 pivots face panels 16 and 18 towards wall 22. As the face panels pivot, they engage the sides of vehicle 20 to help provide a shelter around vehicle 20. The actual structure of dock shelter 10, according to a preferred embodiment, will be described with reference to face panel 16; however, the same construction may be applied to face panels 18 and/or 24.

Figure 4:
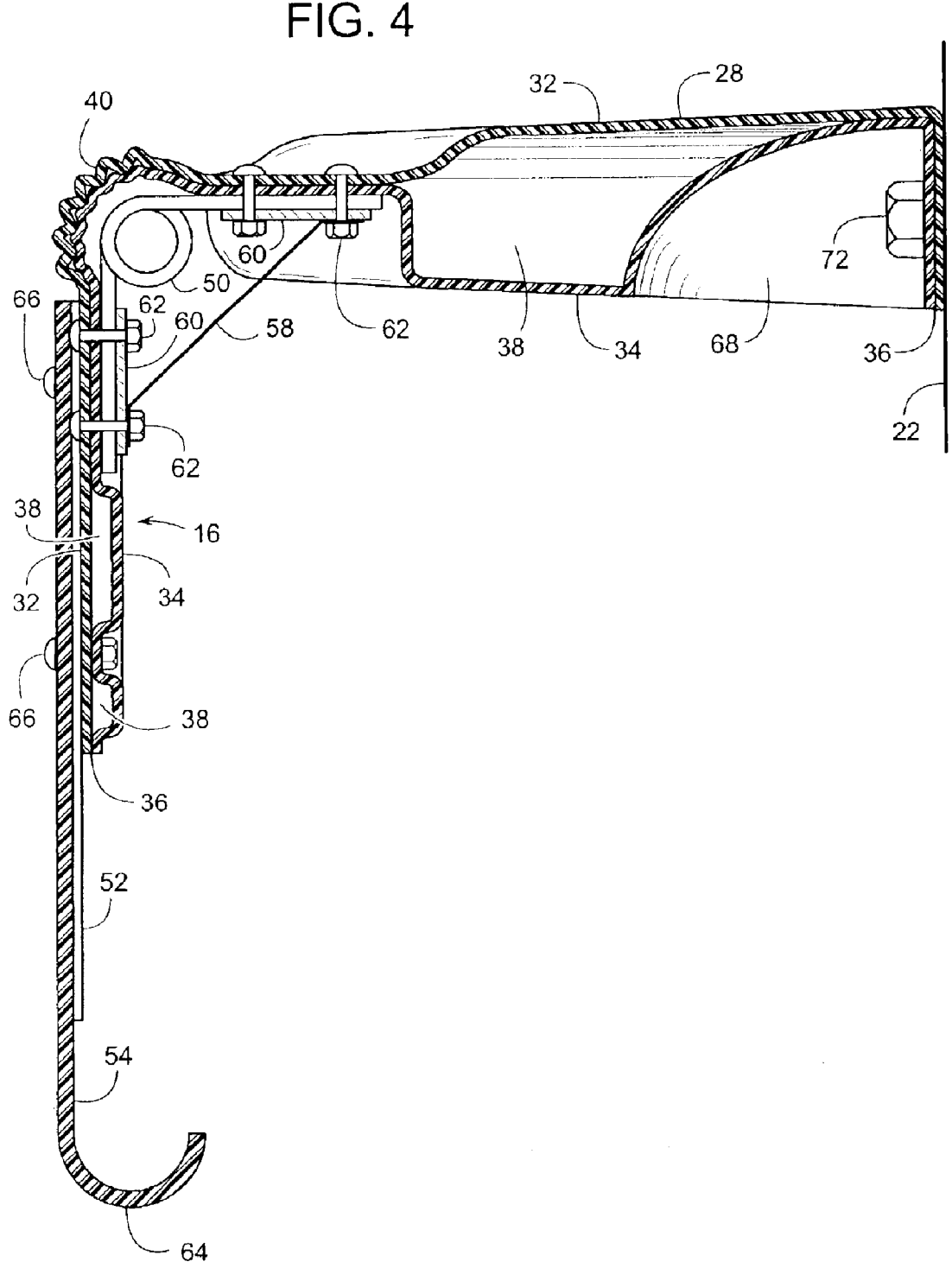
FIG. 4 is a cross-sectional top view taken along line 4—4 of FIG. 1.
Figure 5:
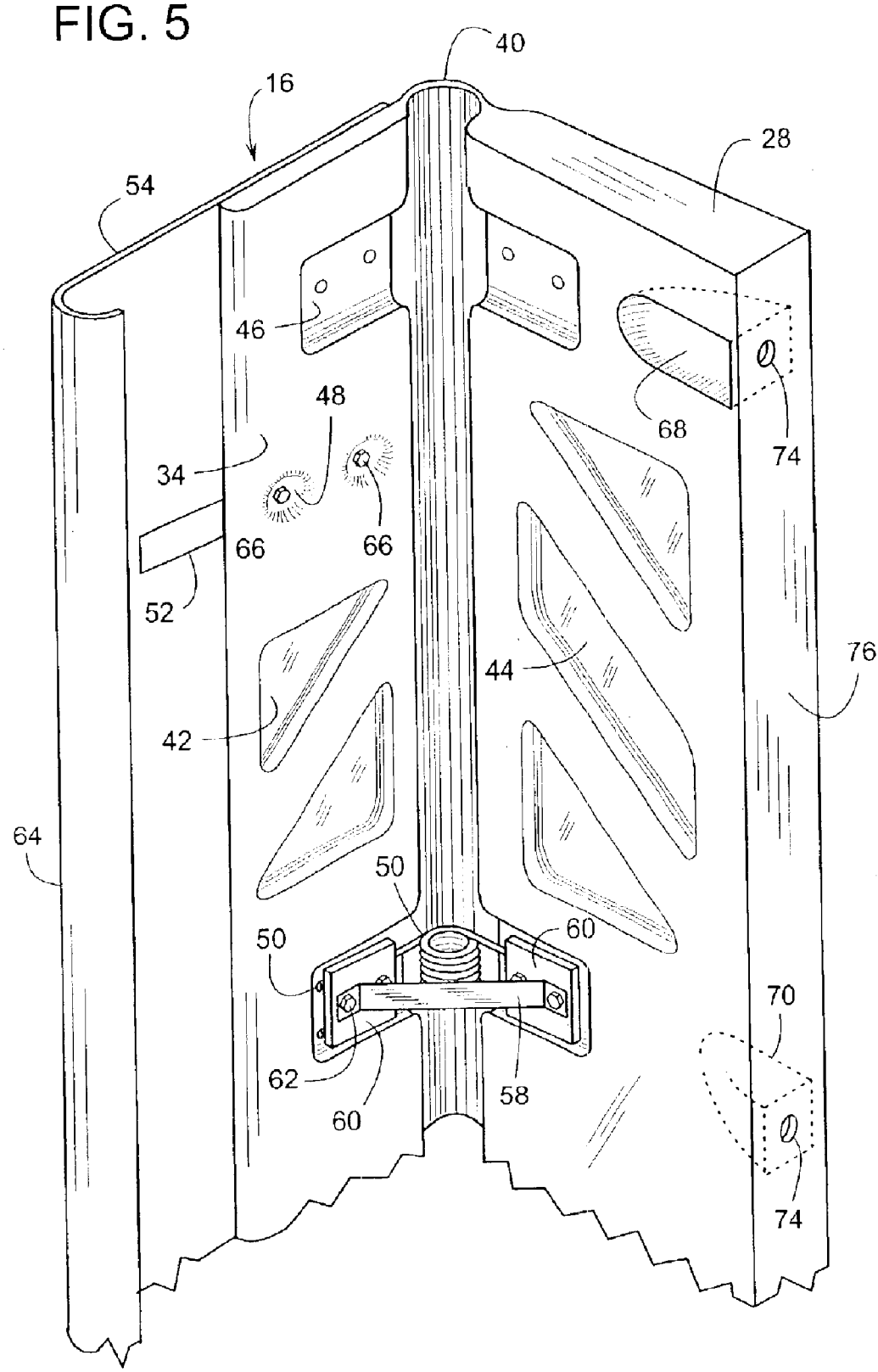
FIG. 5 is a perspective view showing the upper portion of an integrally formed face panel and support panel, wherein some hardware is removed to illustrate various features of the panels.

Referring to FIGS. 4 and 5, face panel 16 comprises an outside casing member 32 and an inside casing member 34 that are joined, and preferably fused (e.g., melted), to each other along their perimeter 36. The term, "fused" refers to a joint wherein separation of the joint would involve severing the base material of one or both of the joined items. However, members 32 and 34 can also be joined in a variety of other ways or by using various fasteners including, but not limited to, screws, snaps, adhesive, clips, etc.

To create a face panel that is generally rigid yet lightweight, casing members 32 and 34 are thermoformed to provide a generally stiff outer shell with a hollow interior (a hollow chamber 38). A twin-sheet thermoforming process, as well known to those skilled in the art, involves expanding two heat-softened thermoplastic sheets (e.g., ⅛-inch thick polyethylene) into two opposing mold cavities by applying an absolute pressure differential between an interior and exterior of the two sheets. The interior or area between the two sheets can be pressurized and/or the exterior of the sheets can be exposed to a vacuum. In some cases, such a process can be applied separately to face panel 16 and support panel 28, which are later connected to each other by a hinge. In a preferred embodiment; however, panels 16 and 28 are thermoformed in a single operation with an integral living hinge 40 formed where panels 16 and 28 meet.

More specifically, outside casing member 32 runs continuously as a unitary sheet across a front face of panel 16 and along one side of support panel 28. Likewise, inside casing member 34 runs continuously as a unitary sheet across a back face of panel 16 and along another side of support panel 28. The two casing members 32 and 34 are not only joined to each other along their perimeter but are also joined at several other locations to provide various useful features.

For example, to increase the rigidity of panels 16 and 28, casing members 32 and 34 include several recessed areas 42 and 44 where the inner surfaces of members 32 and 34 come together. Also, recessed areas 46 and 48 facilitate the mounting of various hardware items, such as a torsion spring 50, leaf spring 52, and an extension plate 54, all of which will be explained further.

While living hinge 40 allows face panel 16 to pivot relative to support panel 28, torsion spring 50 (or some other type of resilient member) interacts with panels 16 and 28 to urge face panel 16 to pivot away from support panel 28 and toward vehicle 20. To limit the angular travel of face panel 16 and establish a predetermined angle 56 between panels 16 and 28 (e.g., 90-degrees, as shown) when a vehicle is not presently at loading dock 14, a fabric strap 58 (or some other pliable elongated member, e.g., chain, cable, rope, etc.) attaches between panels 16 and 28. Spring 50 and strap 58 can be mounted in various ways; however, in some embodiments, opposite ends of spring 50 are held to panels 16 and 28 by way of clamp plates 60 and fasteners 62 (e.g., screws, bolts, rivets, etc.).

Since hollow chamber 38 helps make face panel 16 rather rigid, the more flexible extension plate 54 (e.g., ¼-inch thick polyethylene) can be fastened to it. Extension plate 54 not only provides face panel 16 with a distal edge 64 that is more adapted to seal against vehicle 20, but plate 54 also helps protect against wear of other portions of face panel 16 from wear. Distal edge 64 is preferably curved about a vertical axis to avoid having edge 64 catch against the side of vehicle 20 as vehicle departs loading dock 14.

Figure 6:
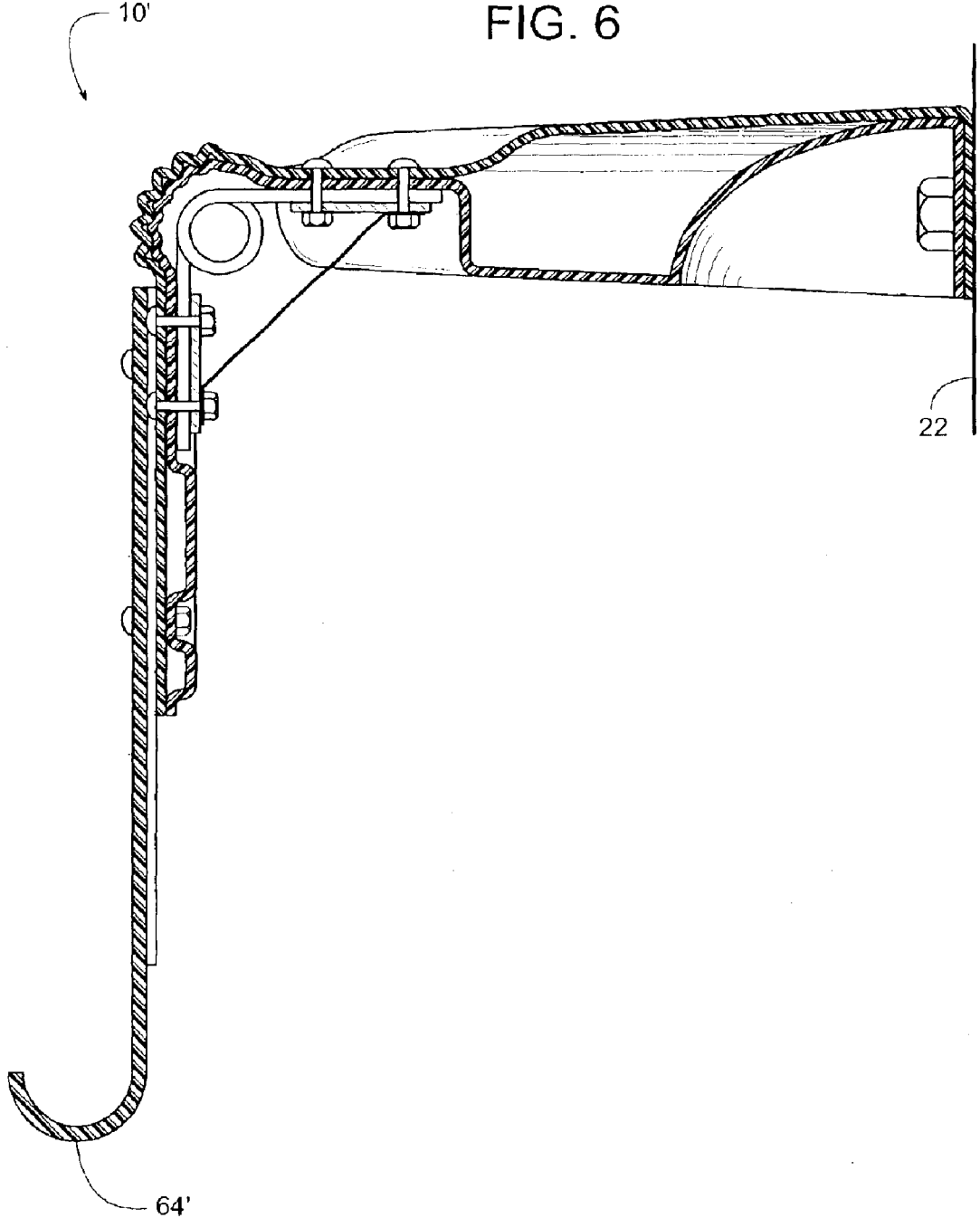
FIG. 6 is a cross-sectional top view similar to FIG. 4 but of another embodiment.

Although edge 64 is shown curved toward the face of wall 22, in some embodiments, the edge can curve in an opposite direction, away from wall 22. In FIG. 6, for example, a dock shelter 10' includes a distal edge 64' that curves away from wall 22. This allows the rear vertical edge of a truck's trailer to fit inside the inner surface of the curved distal edge, whereby the curved distal edge 64' helps seal a gap along the trailer's rear door hinges.

To provide extension plate 54 with additional resilience or spring-back, one or more leaf springs 52 can be installed between plate 54 and the front face panel 16. Fasteners 66 (e.g., rivets, screws, bolts, etc.) can be used to attach plate 54 and spring 52 to face panel 16. Recessed areas 48 that place interior surfaces of casing members 32 and 34 against each other allow fasteners 66 to tightly clamp extension plate 54 and spring 52 against face panel 16 without adversely crushing panel 16.

To adapt support panel 28 for mounting to wall 22, panel 28 is provided with several cavities 68 and 70, which allow fasteners 72 to be inserted through holes 74 and anchored to wall 22. Cavities 68 and 70 are alternately formed in casing members 32 and 34, respectively. Such an alternate arrangement provides support panel 28 with greater strength and resistance to forces that may urge panel 28 to bend about its mounting surface 76.

To enhance the ability of face panel 16 to pivot relative to support panel 28, casing member 32 and/or 34 are corrugated in the area of hinge 40. As face panel 16 pivots through it full range of motion, the corrugations reduce localized strain in the base material of members 32 and 34 by distributing the bending action over the circumference of hinge 40. The reduced strain increases the fatigue life of hinge 40.

Although the invention is described with reference to a presently preferred embodiment, it should be appreciated by those skilled in the art that various modifications are well within the scope of the invention. Therefore, the scope of the invention is to be determined by reference to the claims that follow.

We claim:

1. A dock shelter adapted to provide a least a partial seal between a vehicle and a wall of a building, comprising: a face panel adapted to be coupled to the wall and being moveable relative thereto in reaction to the vehicle engaging the face panel, the face panel includes a first casing member adapted to face away from the wall and a second casing member adapted to face toward the wall, wherein the first and second casing members are substantially fixed relative to each other and define a hollow chamber therebetween, and an extension plate extending from the second casing member and being adapted to be engaged by the vehicle.

2. The dock shelter of claim 1, wherein the first and second casing members are fused to each other.

3. The dock shelter of claim 1, further comprising a support panel adapted to pivotally couple the face panel to the wall, wherein the support panel includes a third casing member and a fourth casing member substantially fixed relative to each other and defining a second hollow chamber therebetween.

4. The dock shelter of claim 3, wherein the third and fourth casing members are fused to each other.

5. The dock shelter of claim 3, wherein the first and third casing members integrally extend from each other to comprise a unitary piece.

6. The dock shelter of claim 5, wherein the first and third casing members create a living hinge therebetween.

7. The dock shelter of claim 6, wherein the living hinge is corrugated.

8. The dock shelter of claim 3, wherein the second and fourth casing members integrally extend from each other to comprise a unitary piece.

9. The dock shelter of claim 8, wherein the second and fourth casing members create a living hinge therebetween.

10. The dock shelter of claim 9, wherein the living hinge is corrugated.

11. The dock shelter of claim 1, further comprising a support panel adapted to pivotally couple the face panel to the wall; and a spring coupled to the support panel and the face panel, wherein the support panel and the face panel define a variable angle therebetween with the spring urging the variable angle to increase.

12. The dock shelter of claim 11, wherein the spring is a torsion spring.

13. The dock shelter of claim 11, further comprising a pliable elongated member coupled to the face panel and the support panel, wherein the pliable elongated member sets an upper limit for the variable angle.

14. The dock shelter of claim 13, wherein the pliable elongated member is a fabric strap.

15. The dock shelter of claim 1, further comprising a leaf spring engaging the extension plate and being adapted to urge the extension plate to an extended orientation relative to the face panel.

16. The dock shelter of claim 1, wherein the face panel defines a plurality of recessed areas that enhance the rigidity of the face panel.

17. The dock shelter of claim 16, wherein the first and second casing members contact each other at the plurality of recessed areas.

18. A dock shelter adapted to provide at least a partial seal between a vehicle and a wall of a building, comprising:
- a face panel adapted to be moveable relative to the wall in reaction to the vehicle engaging the face panel, the face panel includes a first casing member adapted to face away from the wall and a second casing member adapted to face toward the wall, wherein the first and second casing members define a first hollow chamber therebetween;
- an extension plate extending from the second casing member and being adapted to be engaged by the vehicle; and
- a support panel adapted to pivotally couple the face panel to the wall, wherein the support panel includes a third casing member and a fourth casing member that define a second hollow chamber therebetween.

19. The dock shelter of claim 18, wherein the first and second casing members are fused to each other.

20. The dock shelter of claim 18, wherein the third and fourth casing members are fused to each other.

21. The dock shelter of claim 18, wherein the first and third casing members integrally extend from each other to comprise a unitary piece.

22. The dock shelter of claim 18, wherein the first and third casing members create a living hinge therebetween.

23. The dock shelter of claim 22, wherein the living hinge is corrugated.

24. The dock shelter of claim 18, wherein the second and fourth casing members integrally extend from each other to comprise a unitary piece.

25. The dock shelter of claim 18, wherein the second and fourth casing members create a living hinge therebetween.

26. The dock shelter of claim 25, wherein the living hinge is corrugated.

27. The dock shelter of claim 18, further comprising a spring coupled to the support panel and the face panel, wherein the support panel and the face panel define a variable angle therebetween with the spring urging the variable angle to increase.

28. The dock shelter of claim 27, wherein the spring is a torsion spring.

29. The dock shelter of claim 27, wherein further comprising a pliable elongated member coupled to the face panel and the support panel, wherein the pliable elongated member sets an upper limit for the variable angle.

30. The dock shelter of claim 29, wherein the pliable elongated member is a fabric strap.

31. The dock shelter of claim 18, further comprising a leaf spring engaging the extension plate and being adapted to urge the extension plate to an extended orientation relative to the face panel.

32. The dock shelter of claim 18, wherein the face panel defines a plurality of recessed areas that enhance the rigidity of the face panel.

33. The dock shelter of claim 32, wherein the first and second casing members contact each other at the plurality of recessed areas.

34. A dock shelter adapted to provide at least a partial seal between a vehicle and a wall of a building, comprising: a face panel adapted to be coupled to the wall and being moveable relative thereto in reaction to the vehicle engaging the face panel, the face panel includes a first casing member adapted to face away from the wall and a second casing member adapted to face toward the wall, wherein the first and second casing members define a plurality of recessed areas that enhance the rigidity of the face panel, and an extension plate extending from the second casing member and being adapted to be engaged by the vehicle.

* * * * *